United States Patent [19]
Smith

[11] Patent Number: 4,930,223
[45] Date of Patent: Jun. 5, 1990

[54] BEND DETECTOR PIG

[75] Inventor: Dennis R. Smith, Tulsa, Okla.

[73] Assignee: TDW Delaware, Inc., Tulsa, Okla.

[21] Appl. No.: 315,795

[22] Filed: Feb. 27, 1989

[51] Int. Cl.$^5$ .......................... G01B 5/20; G01B 7/28
[52] U.S. Cl. ...................................... 33/302; 33/1 H; 33/777
[58] Field of Search ............ 33/302, 304, 1 H, 178 F, 33/775, 777

[56] References Cited

U.S. PATENT DOCUMENTS

| | | | |
|---|---|---|---|
| 3,732,625 | 5/1973 | VerNooy | 33/777 |
| 3,755,908 | 9/1973 | VerNooy | 33/178 F |
| 3,862,497 | 1/1975 | VerNooy et al. | 33/777 |
| 4,457,073 | 7/1984 | Payne | 33/178 F |
| 4,628,613 | 12/1986 | Laymon et al. | 33/775 |
| 4,780,962 | 11/1988 | Smith | 33/304 |

*Primary Examiner*—William A. Cuchlinski, Jr.
*Assistant Examiner*—William C. Dowling
*Attorney, Agent, or Firm*—Head & Johnson

[57] ABSTRACT

A pipeline bend detector pig for measuring the changes in direction of a pipeline having a first pig body assembly with an imaginary longitudinal axis and spaced apart resilient cups for supporting the pig body assembly in a pipeline so that the axis thereof is at least approximately the axis of the pipeline and for impeding flow of fluid past the pig so that the pig is propelled by fluid flow through the pipeline, and a second pig body assembly also having an imaginary logitudinal axis and means for support thereof within a pipeline so that the axis thereof is at least approximately the axis of the pipeline, a universal joint connecting the front end of the second pig body assembly to the rear end of the first pig body assembly and an integrator plate and finger assembly with the first pig body assembly arranged so that the fingers are deflected upon the deflection of the internal wall of the pipeline to thereby deflect an integrator plate, an instrument responding to the deflection of the integrator plate, and cables connecting at least three of the fingers to points on the second pig body assembly spaced from the longitudinal axis so that as the axis of the second pig body is deflected at an angle relative to the axis of the first pig body, the cables pull on the fingers, deflecting the integrator plate and providing a record of the angular deflection of the second pig body relative to the first pig body which is indicative of a change of direction of the pipeline.

15 Claims, 2 Drawing Sheets

BEND DETECTOR PIG

SUMMARY OF THE INVENTION

Operators of pipelines occasionally need to know the location of bends in the pipelines. While construction engineering drawings frequently include information as to the bends, operators from time to time need to know if changes in a pipeline has occured. Such changes can be caused by shifts in the earth due to earth quakes or errosion, or by physical contact with the pipeline such as by a ship anchor being caught on the pipeline. Therefore, a need exists for an instrument to run through a pipeline to provide a record of changes in direction, also referred to as "bends", in the pipeline.

In addition, and a more frequent requirement of pipeline operators is to determine the internal configuration of the cylindrical wall of the pipeline. For this reason, caliper pigs, sometimes referred to as geometry pigs, have for many years been utilized in pipelines. For reference to a type of caliper pig which has proven highly successful in detecting dents, buckles and so forth in a pipeline, reference may be had to U.S. Pat. No. 3,755,908 entitled "Pipeline Pig", issued Sept. 4, 1973. The pipeline pig disclosed in this patent is very effective for providing a record of pipeline geometry, but was not intended to provide a record of changes in direction (bends) of a pipeline.

Others have suggested means for detecting bends in a pipeline; and for examples of pipeline pigs for detecting bends reference may be had to U. S. patent application Ser. No. 558,105 filed Dec. 5, 1983 and entitled "PIPELINE BEND VERIFICATION PIG". Another reference to a pig for detecting bends in a pipeline is U.S. Pat. No. 4,628,613 issued Dec. 16, 1986, entitled "Bend Detector For A Pipeline Pig".

These references are indicative of the state of the art of pigs for determining changes in direction of a pipeline. Neither of these references provide concurrently a caliper survey service. The present invention is directed to a type of pipeline pig which provides both a caliper survey, that is, provides a record indicating the geometry of an internal wall of a pipeline; and, in addition, provides a record of the changes in direction or bends in the pipeline. More particularly, the present invention provides a pipeline pig including mechanisms for providing a record of a geometry of the pipeline and for bends in the pipeline utilizing the same recording mechanisms for providing both indications and wherein the geometry survey and bend survey are reported on the same records produced by the pipeline pig.

The pipeline pig includes a first pig body assembly having an imaginary longitudinal axis. Means are provided for supporting the first pig body assembly in a pipeline in a manner such that its longitudinal axis is at least approximately at the pipeline center. This means is preferably in the form of elastomeric cups placed adjacent the front end and adjacent the rear end of the first pig body assembly. Not only do such cups provide an ideal means of supporting the big body assembly centrally within a pipeline, but they also provide means for impeding the flow of fluid therepast so that the pig body assembly is propelled by such fluid flow along the interior of the pipeline.

An integrator plate is carried by the first pig body assembly adjacent the rearward end thereof. A plurality of spaced apart fingers are hinged each at the inner end to the pig body assembly and the outer end responds to the deviations in the internal wall of the pipeline. An integrator plate is carried by the pig body assembly and each of the fingers is connected to the integrator plate by a linkage so that as the fingers are deflected the integrator plate is deflected. By means of a shaft supporting the integrator plate extending to an instrument packaged within the first pig body assembly, the deflection of the integrator plate is recorded.

The pig includes a second pig body assembly having a longitudinal axis and means to support the assembly in a pipe wherein the longitudinal axis is at least approximately coincident with the pipeline center. The second pipeline pig assembly preferably includes an elastomeric cup providing the means for supporting it centrally within the pipeline.

A universal joint connects the second pig body assembly forward end to the first pig body assembly rearward end so that the two pig body assemblies are each supported centrally within the pipeline. Each has an imaginary longitudinal axis so that when the pig travels in a straight line the imaginary axis of both pig body assemblies are coincident or at least in planes parallel to each other. As the pig traverses a change in direction or bend in a pipeline, the longitudinal axis of the second pig body assembly forms an angle relative to the axis of the first pig body assembly.

To detect this deviation in the axis of the second pig body assembly relative to the first pig body assembly, a plurality of at least three linkages, such as cables, are affixed to the second pig body assembly adjacent the forward end thereof. The other end of each linkage is attached to one of the fingers of the first pig body assembly. In this manner, as the second pig body assembly is deflected relative to the first, the fingers are deflected, thereby deflecting the integrator plate and providing a record of a bend in the pipeline.

In this manner the same recording mechanism and the same mechanism used for detecting deviations in the wall of the pipeline is used in conjunction with a second pig body assembly to detect and record bends in the pipeline.

A better understanding will be had to reference to the following description and claims taken in conjunction with the attached drawings.

DESCRIPTION OF THE PREFERRED EMBODIMENT

Figure 1:
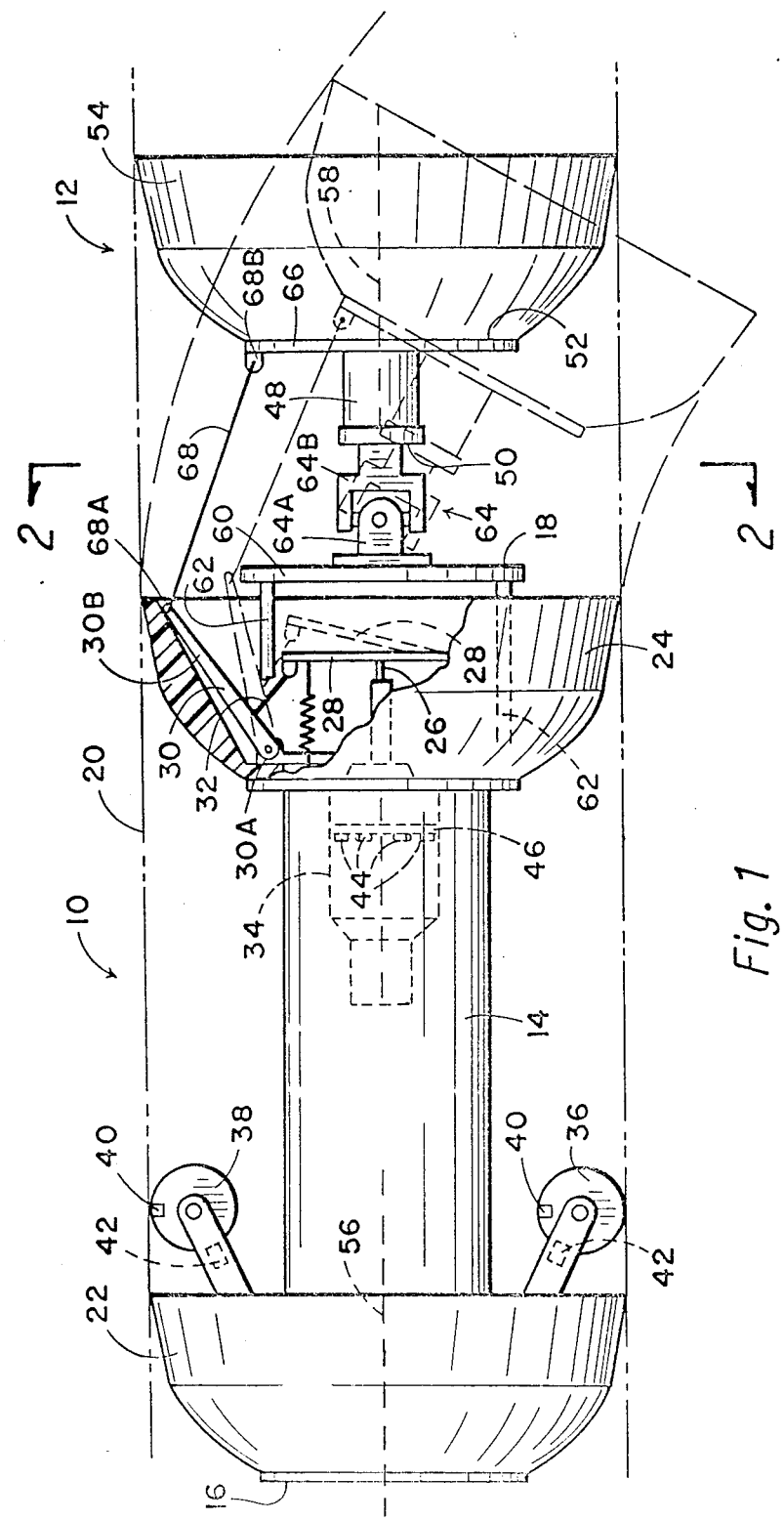
FIG. 1 is an orthographic view of a pipeline pig of this invention with the rear cup of the first pig body shown partially cut away and showing the pig in a pipeline, the interior wall of the pipeline being in dotted line. Also, shown in dotted line is the situation wherein a bend in the pipeline is encountered and in which the second pig body assembly is in dotted outline showing how the bend in the pipeline is detected.

The following disclosures are incorporated in the present disclosure by reference:

1. U.S. Pat. No. 3,755,908 issued Sept. 4, 1973 entitled "Pipeline Pig". This patent shows a type of pipeline pig used to provide a caliper survey of the pipeline; that is, provide a record of changes in the internal configuration of the wall of the pipeline. This patent shows how an integrator plate is used to move a shaft to mark a record as an indication of deviations in the wall of the pipeline.

2. U.S. Pat. No. 3,732,625, issued May 15, 1973. This patent show the use of an odometer wheel for measuring the distance of travel in a pipeline and for advancing a record in direct proportion to the distance of travel.

3. U.S. Pat. No. 3,862,497 issued Jan. 28, 1975 entitled "Pipeline Pig." This patent shows the advantageous use of two odometer wheels and circuitry for measuring the travel of a pig in a pipeline and for advancing a record in direct proportion to the travel of the pig.

4. Patent application Ser. No. 822,755 filed Jan. 17, 1986, entitled "Improved Pipeline Caliper Pig". This patent shows a type of caliper pig as set forth in U.S. Pat. No. 3,755,908, and improvements therein particularly wherein means are provided for indicating the orientation of a deviation in the internal wall of the pipeline; that is, whether the deviation occurs at the top, bottom, left side, right side, etc. This application discloses the use of an integrator plate and a plurality of shafts employed to produce the record, and also shows a mechanism for providing axial orientation signals for the caliper pig. The present invention may be employed utilizing a caliper pig as a portion thereof, such caliper pig being of the type as shown in U.S. Pat. No. 3,755,908 or the type shown in U.S. patent application Ser. No. 822,755.

Referring to the drawings, a first pig body assembly is generally indicated by the numeral 10 and a second pig body assembly is generally indicated by the numeral 12. As previously indicated, the first pig body assembly 10 may, for example, be of the type illustrated and described in U.S. Pat. No. 3,755,908 or as illustrated and described in application Ser. No. 822,755. Generally, the first pig body assembly 10 includes a central tubular body portion 14 having a forward end 16 and a rearward end 18. Means must be provided for supporting the tubular body 14 centrally within the interior cylindrical wall of a pipeline indicated by the numeral 20. Such means is preferably provided by elastomeric cups including a forward cup 22 and a rearward cup 24. In addition, for supporting the pig body assembly centrally within a pipeline, the cups provide an ideal means of impeding the flow of fluid through the pipeline. In practice, at least one of the cups, and preferably the forward cup 22, is configured so as to impede the fluid flow so that the pig moves generally at the velocity of fluid flow through the pipeline. In practice, it is sometimes a preferred arrangement to have the openings (not shown) in rearward cups 24 and 54 so that the forward pig 10 is pulled by the forward cup 22 through the pipeline.

For use in detecting deviations in the internal wall of a pipeline, a reciprocal shaft 26 supports an integrator plate 28. Attached to the pig body is a plurality of fingers 30 each having an inner end 30A pivoted to the pig body assembly 10. The outer end portion 30B engages the interior of elastomeric cup 24. In some arrangements fingers 30 extend to slide upon the interior wall 20 of the pipeline or to have rollers which roll on the interior wall of the pipeline. In any event, the fingers 30 are deflected inwardly when an indentation in the interior wall 20 of a pipeline is encountered. This inward deflection of each finger 30 is coupled by a linkage 32 to the integrator plate 28. The deflection of a finger deflects the integrator plate 28 and thereby axially displaces shaft 26 to provide an indication on a record contained in the instrument housing 34, all as fully described in U.S. Pat. No. 3,755,908.

In addition to responding to the deflection of shafts 26, the instrument within housing 34 responds to movement through the pipeline by use of odometer wheels 36 and 38. Each of the odometer wheels 36 and 38 has a permanent magnetic 40 thereon which activates magnetic sensitive elements such as a read switch 42 upon each revolution of the odometer wheels providing a signal to advance the record in instrument housing 34. All as set forth in detail in U.S. Pat. Nos. 3,732,625 and 3,862,497.

In addition to the deflection of shaft 26, integrator plate 28 may be utilized in a system for detecting the orientation of the deflection in an internal wall of a pipeline. For this purpose an apparatus for providing a signal indicative of the vertical is required such as by the use of a plurality of mercury switches 44 mounted radially on a plate 46 within the instrument housing 34. The mercury switches provide signals which are utilized in conjunction with the signals from the integrator plate 28 to provide vertical orientation. This arrangment is set forth in detail in patent application Ser. No. 822,755 previously referenced.

That which has been described up to this point is prior art as to the present disclosure. The objective of the present disclosure is accomplished by the provision of a second pig body assembly 12 in combination with the first pig body assembly 10. The second pig body assembly includes a body portion 48 having a forward end 50 and a rearward end 52. The body portion 48 is supported centrally within the interior 20 of the pipeline such as by means of an elastomeric cup 54 which is secured to the body rearward end 52. In some arrangements the second pig body assemby may also include a central tubular body portion supported by forward and rearward cups similar to the first pig body assembly. In any event, it can be seen that the cup 54 may be of the same type as cups 22 and 24 of the first pig body assembly.

The first pig body assembly 10 has a central, longitudinal imaginary axis indicated by the dotted line 56, and, in like manner, second pig body assembly 12 has a central, longitudinal imaginary axis 58. Each imaginary axis 56 and 58 is supported centrally within the cylindrical axis of the pipe wall 20 and substantially coaxially of each or, at least, in planes closely paralleled to each other as long as the pig is in a linear section of the pipeline. If the pig traverses a section of the pipeline having a bend therein, the axis 58 of the second body assembly 12 will be deflected relative to the axis 56 of the first pig body assembly.

First pig body assembly is provided wth a rearward plate 60 which is fixed relative to the tubular body 14 and held such as by means of fixed rods 62. Secured to the plate 60 is a forward portion 64A of a universal joint, the universal joint being generally indicated by the numeral 64. The rearward portion 64B of the universal joint is secured to the forward end 50 of the second body assembly 12. Thus, the second body assembly is pivotally attached to the first body assembly and is moved through the pipeline with the first body assembly and is free to pivot with respect to the first body assembly.

Figure 2:
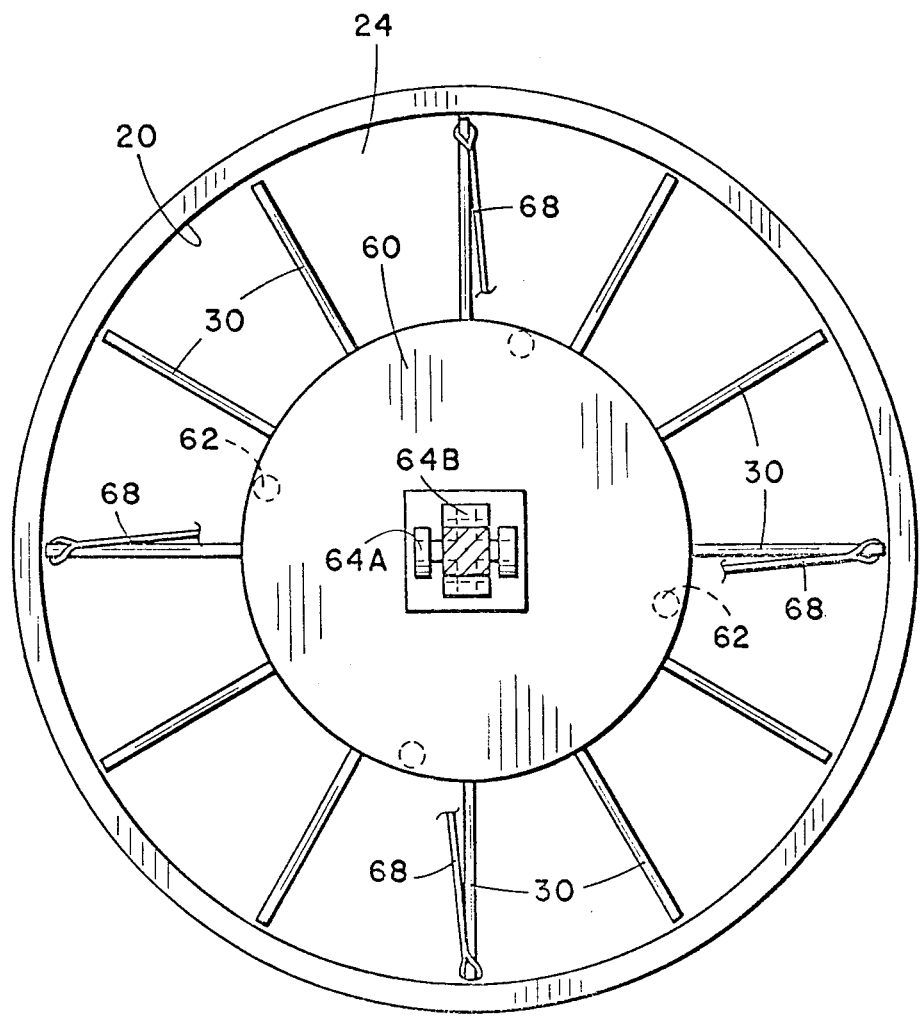
FIG. 2 is a cross-sectional view taken along the line of 2—2 of FIG. 1 and showing the rearward end of the first pig body assembly.

A plate 66 is secured to the body portion 48 of the second body assembly and extends in a plane radially of the second body assembly axis 58. Extending at spaced points adjacent the periphery of plate 66 are cables 68, only one of which is seen in FIG. 1 for purposes of simplicity, but four of which are seen in FIG. 2. At least 3 spaced apart cables 68 are required in the practice of the invention. The forward end 68A of each of the cables is affixed to a finger 30 adjacent an outer end portion 30B thereof. The rearward end of each of the cables is affixed to plate 66 adjacent to the periphery thereof; that is, spaced from the axis 58. Cables 68 serve to deflect the fingers 30 to which they are attached when the pig traverses a bend in a pipeline; that is, when axis 58 assumes an angular relationship relative to axis 56. When a bend is encountered, the pivotation at the universal joint 64 is transmitted by cables 68 to the appropriate fingers 30 and by linkages 32 to integrator plate 28. The occasion of a bend deflects plate 28 asymmetrical with respect to the body axis 56, as shown in the dotted outline in FIG. 1 and such deflection is transmitted to the record within instrument housing 34.

Thus, the invention provides a unique adaptation of a highly commercially successful caliper pig as described in detail in U.S. Pat. No. 3,755,908 or the improved version thereof as described in patent application Ser. No. 822,755 for use in providing a caliper survey and a bend detector survey simultaneously and on the same record.

As shown in U.S. Pat. No. 3,755,908 the deflection of shaft 26 is indicated by marks on the record. A bend will occur in the same manner as marked on the record when the record is of the type as contemplated in U.S. Pat. No. 3,755,908 except that a deviation in the internal wall of the pipeline (usually a dent or buckle) is usually of relatively short length so that the record will show a very short blip by the marking pen, whereas a deflection of the integrator plate caused by a bend will occur over a longer period of advancement of the record, thus causing a relatively wide blip by the marking pen. While both geometry survey results and bend detector results will be recorded by deflection of shaft 26 a bend can be easily differentiated by an experienced operator of the combined caliper/bend detector pig. In like manner, the record provided by the recordation of the electrical signals as contemplated in patent application Ser. No. 822,755 can be readily differentiated by an experienced operator as to whether such a record indicates deviations in the internal wall geometry or the occurrence of a bend.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A pipeline bend detector pig for measuring the changes in direction of a pipeline comprising:

a first pig body assembly having an imaginary longitudinal axis having a front end and a rearward end and having means for support thereof generally centrally within a pipeline and for impeding flow of fluid past the pig so that the pig is propelled by fluid flow through the pipeline;
  a second pig body assembly having an imaginary longitudinal axis and having means for support thereof generally centrally within a pipeline;
  means pivotally connecting said second pig body assembly to the rearward end of said first pig body assembly whereby said first and second pig body assemblies move together by the force of fluid flow through a pipeline;
  means carried by one of said pig body assemblies providing a first signal indicating the travel of said body assemblies through a pipeline;
  means providing a second, a symmetric signal indicating the angle of said second body longitudinal axis relative to said first body longitudinal axis; and
  means providing a third signal indicating the orientation relative to the vertical of the angle of said second body longitudinal axis relative to said first body longitudinal axis; and
  means carried by one of said body assemblies of providing a record indicative of said first, second and third signals.

2. A pipeline bend detector pig according to claim 1 wherein said means pivotally connecting said second pig body assembly to the rearward end of said first pig body assembly includes a universal joint means.

3. A pipeline bend detector pig according to claim 1 wherein said means providing a second signal indicating the angle of said second body longitudinal axis relative to said first body longitudinal axis includes:

a plurality of spaced apart finger means each hinged at one end to said first pig body assembly adjacent said rearward end thereof;
  means providing a signal when one or more finger means are deflected relative to said first pig body assembly longitudinal axis; and
  means connecting said second pig body assembly to said finger means whereby when the axis of said second pig body assembly is deflected relative to the axis of said first pig body assembly at least one of said finger means is deflected.

4. An improved pipeline caliper pig according to claim 1 wherein said means for determining the orientation of said pig body assembly about its longitudinal axis relative to the vertical includes a plurality of gravity sensitive switch means arranged in spaced angular relationship about said pig body assembly longitudinal.

5. An improved pipeline caliper pig according to claim 1 including:

an integrator plate and means for deflection said integrator plate in response to deviations in the internal pipeline wall;
  elastomeric means having engagement with the internal pipeline wall; and
  means coupling the deflecting of said elastomeric means to said integrator plate.

6. An improved pipeline caliper pig according to claim 5 wherein said means coupling the deflection of said elastomeric means to said integrator plate includes:

a plurality of spaced apart finger means each hinged at one end to said pig body assembly; and
  linkage means for each of said finger means to said plate.

7. A pipeline pig according to claim 5 wherein said means for deflecting said integrator plate in response to the deflection of said second pig body longitudinal axis relative to said first pig body longitudinal axis includes a plurality of at least three coupling means each having a forward end and a rearward end, the forward end of each said coupling means being connected to said finger means and the second end of each said coupling means being connected to the said second pig body assembly at a point adjacent the forward end thereof and spaced from said second body assembly longitudinal axis.

8. A pipeline pig for providing indications of the deviations of an inner wall of a pipeline from a nominal cross-sectional configuration, and changes in direction of the pipeline, comprising:
- a first pig body assembly having a longitudinal axis and means for supporting the first pig body assembly in a pipeline wherein the longitudinal axis is at least approximately the pipeline center and means for impeding the flow of fluid therepast so that the pig body is propelled by such fluid flow along the pipeline;
- an integrator plate carried by said first pig body assembly;
- means for deflecting said integrator plate in response to deviations in the internal pipeline wall;
- means for detection of the deflection of said integrator plate and for recording the detected deflections;
- a second pig body assembly having a longitudinal axis and means to support the second pig body assembly in a pipeline wherein the longitudinal axis is at least approximately the pipeline centers and means connecting the second to the first pig body assembly; and
- means for deflecting said integrator plate in response to the deflection of said second pig body assembly longitudinal axis relative to said first pig body assembly longitudinal axis.

9. A pipeline pig according to claim 8 including:
- means for simultaneously determining the recording the orientation of said pig body assembly about its longitudinal axis relative to the vertical whereby the axial orientation of detected deviations and changes in direction of the pipeline are determinable.

10. A pipeline pig according to claim 8 including means pivotally connecting said second pig body assembly to the rearward end of said first pig body assembly by a universal joint means.

11. A pipeline pig according to claim 8 wherein said means for deflecting said integrator plate in response to deviations in the internal pipeline wall includes:
- a plurality of spaced apart finger means each hinged at one end to said first pig body assembly;
- means providing a signal when one or more finger means are deflected relative to said first pig body assembly longitudinal axis; and
- means connecting said second pig body assembly to at least some of said finger means whereby when the axis of said second pig body assembly is deflected relative to the axis of said first pig body assembly at least one of said finger means is deflected.

12. A pipeline pig according to claim 9 wherein said means for determining the orientation of said pig body assembly about its longitudinal axis relative to the vertical includes a plurality of gravity sensitive switch means arranged in spaced angular relationship about said pig body assembly longitudinal axis.

13. A pipeline pig according to claim 8 including:
- elastomeric means affixed to said first pig body assemblies having engagement with the internal pipeline wall; and
- means coupling the deflection of said elastomeric means to said integrator plate.

14. A pipeline pig according to claim 13 wherein said means coupling the deflection of said elastomeric means to said integrator plate includes:
- a plurality of spaced apart finger means each hinged at one end to said pig body assembly; and
- linkage means from each of said finger means to said plate.

15. A pipeline pig according to claim 13 wherein said means for deflecting said integrator plate in response to the deflection of said second pig body longitudinal axis relative to said first pig body longitudinal axis includes a plurality of at least three coupling means each having a forward end and a rearward end, the forward end of each said coupling means being connected to said finger means and the second end of each said coupling means being connected to the said second pig body assembly at a point adjacent the forward end thereof and spaced from said second body assembly longitudinal axis.

* * * * *